April 1, 1969 KOJI TADENUMA 3,436,481

REGENERATION SYSTEM FOR A TRANSMITTED TELEGRAPH SIGNAL

Filed Jan. 21, 1966 Sheet 1 of 2

3,436,481
Patented Apr. 1, 1969

3,436,481

REGENERATION SYSTEM FOR A TRANSMITTED TELEGRAPH SIGNAL

Koji Tadenuma, Tokyo-to, Japan, assignor to Kokusai Denshin Denwa Kabushiki Kaisha, Tokyo-to, Japan, a joint-stock company of Japan Filed Jan. 21, 1966, Ser. No. 522,235
Claims priority, application Japan, Jan. 25, 1965, 40/3,652
Int. Cl. H04l 25/20, 25/52
U.S. Cl. 178—70 3 Claims This invention relates to a regenerating system for a transmitted telegraph signal.

In the conventional transmission system for a telegraph signal, it is necessary that a pass band of more than W cycle/second be assured to correctly detect a transmitted telegraph signal having the highest telegraph modulation frequency ($W/2$) cycle/second. As known in the art, a wave frequency-modulated by a rectangular wave can be represented by the following equation:

$$e=\frac{2m}{\pi}\left[\frac{1}{m^2}\sin(m\pi/2)\cos\omega t+\frac{1}{m^2-1}\cos(m\pi/2)\{\cos(\omega-p)t-\cos(\omega+p)t\}-\frac{1}{m^2-2^2}\sin(m\pi/2)\{\cos(\omega-2p)t-\cos(\omega+2p)t\}+\cdots\right]$$

where:

$\omega$=angular velocity of the carrier wave
$m$=modulation index ($\Delta f/2p$)
$\Delta f$=shift frequency
$p$=angular velocity of the rectangular wave In proportion to the increase of the modulation frequency ($p/2\pi$), the respective frequency spacing between adjacent spectrums of side bands components the angular velocity of which are represented by values ($\omega-p$), ($\omega+2p$), ($\omega-2p$), ($\omega+2p$) . . . increases. If the modulation frequency ($p/2\pi=W$ cycle/second) is over one half the bandwidth of the transmission channel, a spectrum of the side band components cannot be transmitted. In such a condition, the carrier frequency only is included in the transmitted wave, so that the rectangular wave transmitted cannot be regenerated in the conventional regenerating system. A telegraph signal, such as that of a 5-unit code or 7-unit code, generally includes spectrums of modulation frequency which are multiples of the frequency of the code element. Accordingly, code elements the polarity of which are alternatively changed are at first destroyed in accordance with decrease of their pass bandwidth since the frequency of a code element is the highest modulation frequency.

An object of this invention is to provide a regenerating system for a telegraph signal transmitted through a telegraph pass-band narrower than twice the highest telegraph modulation frequency of the signal.

According to the present invention there is provided a regenerating system for a transmitted telegraph signal, comprising a rectangular wave oscillator having a frequency substantially equal to the frequency of the code element of the transmitted telegraph signal, a level detector for detecting whether or not the instantaneous level of the transmitted telegraph signal exceeds a predetermined level range and for detecting the polarity of the excess level of the transmitted telegraph signal from the level range, control means for causing, only when the level detector detects that the instantaneous level does not exceed the level range, the oscillator to generate a rectangular wave having the frequency of the code element of the transmitted telegraph signal and for causing, when the level detector detects that the instantaneous level exceeds the level range, the oscillator to change the polarity of the rectangular wave in accordance with the polarity of said excess level, whereby a regenerated telegraph signal is derived from the oscillator.

The novel features of this invention are set forth with particularity in the appended claims. This invention, however, as to its construction and operation together with advantages thereof, may best be understood by reference to the following description, taken in connection with the accompanying drawings in which the same or equivalent parts are designated by the same or similar reference numerals or characters, and in which:

Figure 1:
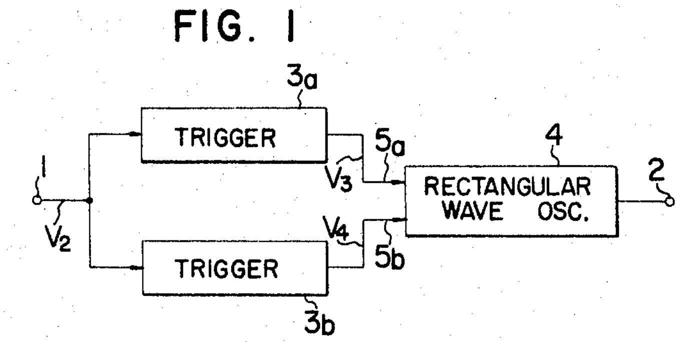
FIG. 1 is a block diagram of an embodiment of this invention.
Figure 3:
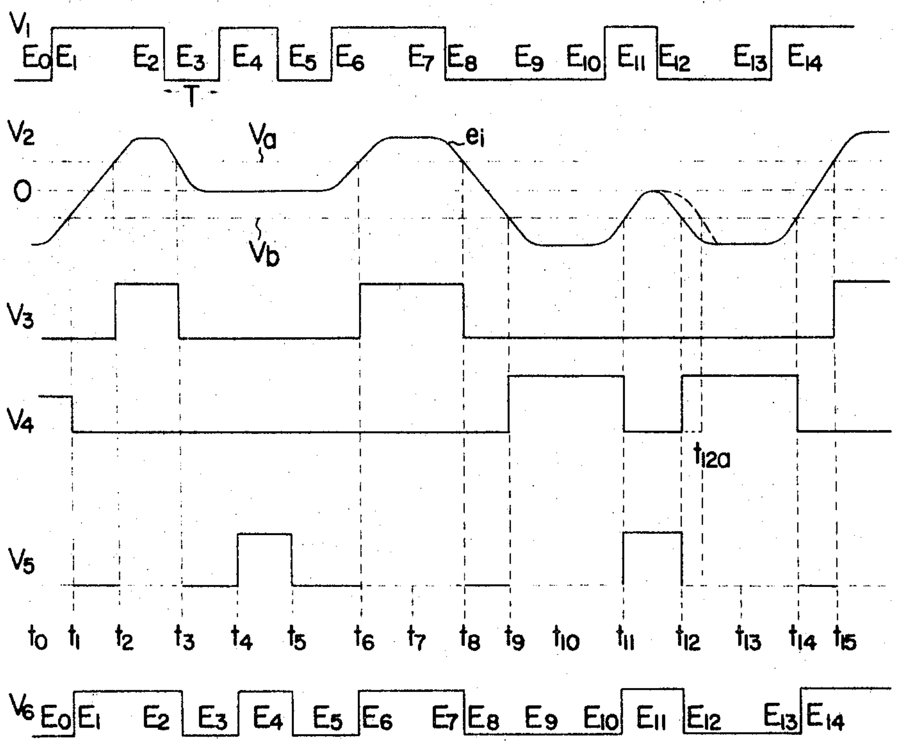
FIG. 3 shows waveforms for describing the operation of the circuit illustrated in FIG. 1.

Referring to FIGS. 1 and 3, the principle of this invention will first be described. The embodiment of this invention shown in FIG. 1 comprises a rectangular wave oscillator 4, a level detector (3*a* and 3*b*), and control means (5*a* and 5*b*). It is assumed that a telegraph signal $V_1$ (FIG. 3) of W bands is transmitted through a telegraph pass band narrower than ($W/2$) cycle/second and that the signal is received and applied as a wave $V_2$ to an input terminal 1. Code elements $E_3$, $E_4$, $E_5$, and $E_{11}$ of the wave $V_1$ are modulated with a frequency $W/2$ cycle/second, and the modulated signal cannot be transmitted through the pass-band ($W/2$) cycle/second, so that instantaneous levels of the transmitted wave $V_2$ corresponding to these code elements are zero as shown. The transmitted wave $V_2$ is applied to the level detector which is composed of, for example, a pair of trigger circuits 3*a* and 3*b*. These circuits 3*a* and 3*b* respectively have trigger levels $Va$ and $Vb$ and detect whether or not the instantaneous level ($e_1$) of the transmitted telegraph signal $V_2$ exceeds a predetermined level range $Va$–$Vb$. The transmitted wave $V_2$ is converted, by the trigger circuits 3*a* and 3*b*, to rectangular waves $V_3$ and $V_4$, which are applied to the rectangular wave oscillator 4 through terminals 5*a* and 5*b*. The polarity of waves $V_3$ and $V_4$ indicates the polarity of the excess level of the wave $V_2$ from the range $Va$–$Vb$; that is, durations ($t_2$–$t_3$), ($t_6$–$t_8$) and ($t_{14}$–$t_{15}$) are plus, and durations ($t_0$–$t_1$), ($t_9$–$t_{11}$), and ($t_{12}$–$t_{14}$) are minus. The frequency of the oscillator 4 is substantially equal to the frequency of the code element of the transmitted telegraph signal $V_2$ and is controlled by the outputs 5*a* and 5*b* of the level detector (3*a* and 3*b*). The oscillator 4 operates under the following conditions:

(i) Only when the level detector (3*a* and 3*b*) detects that the instantaneous level ($e_1$) of the wave $V_2$ does not exceed the level range ($Va$–$Vb$) by more than the duration T of the code element ($E_1$, $E_2$, . . . $E_{14}$ . . .): the oscillator 4 generates a rectangular wave $V_5$ having the frequency ($W/2$) of the code element of the transmitted telegraph signal $V_2$.

(ii) When the level detector (3*a* and 5*b*) detects that the instantaneous level ($e_1$) exceeds the level range ($Va$–$Vb$): the oscillator change the polarity of a rectangular wave ($V_6$) in accordance with the polarity of the excess level.

By combination of these operations (i) and (ii), a regenerated wave $V_6$ corresponding to the transmitted telegraph signal $V_1$ is derived from an output terminal 2 of the oscillator 4.

Figure 2:
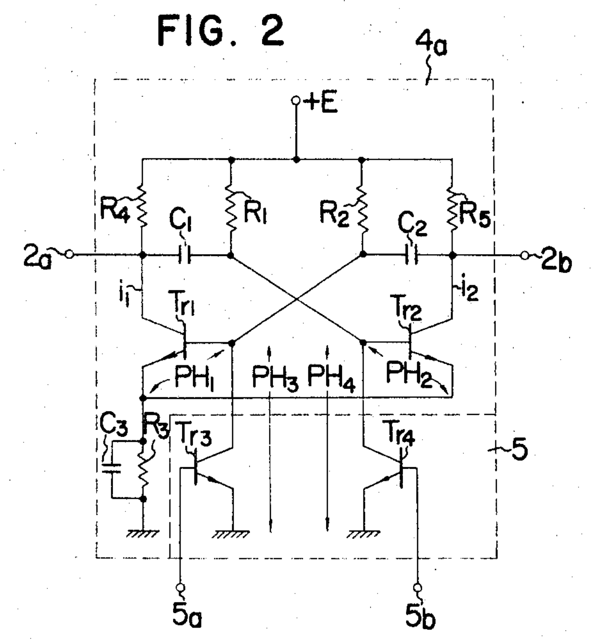
FIG. 2 is a connection diagram for illustrating a rectangular wave oscillator and control means of this invention.

An example of the rectangular wave oscillator 4 is illustrated in FIG. 2. In this embodiment, transistors $Tr_1$ and $Tr_2$ form an astable multivibrator 4*a*, together with time constant circuits each composed of a resistor ($R_1$ or $R_2$) and a capacitor ($C_1$ or $C_2$), and a bias circuit composed of a resistor $R_3$ and a capacitor $C_3$. Terminal 2*a* (or 2*b*) is the output terminal of this multivibrator 4*a* for deriving therefrom the rectangular wave $V_6$. The collectors of transistors $Tr_3$ and $Tr_4$ are respectively connected to the bases (control electrodes) of the transistors $Tr_1$ and $Tr_2$, and the emitters of the transistors $Tr_3$ and $Tr_4$ are connected to the earth (ground) potential. The resistances of the collector-to-emitter paths ($PH_3$ and $PH_4$) of the transistors $Tr_3$ and $Tr_4$ are adjusted to "low" or "high" values by applying the waves $V_3$ and $V_4$, respectively, to terminals 5*a* and 5*b* (which are respectively connected to the bases of transistors $Tr_3$ and $Tr_4$). Accordingly, the base-to-emitter paths ($PH_1$ and $PH_2$) of the transistors $Tr_1$ and $Tr_2$ are adjusted so as to be "open" or "shorted" (particularly, through the bias circuit of $R_3$ and $C_3$) by the waves $V_3$ and $V_4$ applied to the terminals 5*a* and 5*b*.

Only when both of the paths ($PH_1$ and $PH_2$) are in the "open" state, the oscillator 4*a* operates, as an astable multivibrator changing the polarity of its output, at a frequency determined by the value of the time constant circuits ($R_1$, $C_1$ and $R_2$, $C_2$). When either of the "short" states of the paths ($PH_1$ and $PH_2$) is established, the oscillation of the oscillator 4*a* stops, and the polarity of the output of the oscillator 4*a* is changed to the plus or minus state in accordance with the alternative "short" state of the path ($PH_1$ or $PH_2$).

Referring to FIG. 3, operation of the oscillator 4*a* will now be described in detail.

(1) Time interval ($t_0$–$t_1$).—The polarity of the wave $V_4$ only is plus, and this plus potential is applied to the terminal 5*b*. Since the base of the transistor $Tr_4$ becomes plus, the path $PH_4$ of the transistor $Tr_4$ is established to pass through low resistance through which the base of the transistor $Tr_2$ is connected to earth potential. Accordingly, the transistor $Tr_2$ is cut off by the bias voltage across the bias circuit ($R_3$, $C_3$), and, therefore, a current ($i_1$) from a source (+E) flows through only the transistor $Tr_1$. As a result of the potential difference across a resistance $R_4$, the polarity of the output ($V_6$) becomes minus.

(2) Time interval ($t_1$–$t_2$).—The polarity of the wave $V_4$ becomes minus at the time $t_1$. Because this minus voltage cuts off the transistor $Tr_4$, the base potential of the transistor $Tr_2$ rises abruptly. In this case, since the collector potential of the transistor $Tr_2$ is high while the collector potential of the transistor $Tr_1$ is low, the current from the source (+E) surges into the transistor $Tr_2$. Accordingly, the transistor $Tr_2$ becomes "ON," and the transistor $Tr_1$ is cut off ("OFF" state).

As a result of these operations, the collector potential of the transistor $Tr_1$ rises abruptly. Moreover, since these operations are carried out in an instant, the abrupt rise of the collector potential of the transistor $Tr_1$ occurs simultaneously with the transition instant ($t_1$) (plus to minus) of the wave $V_4$.

In this time interval ($t_1$–$t_2$), the polarity of the output ($V_6$) is plus, which is sustained to the time $t_2$ because the duration ($t_1$ to $t_2$) is shorter than the time constant $\tau$ of the time constant circuits ($R_1$, $C_1$; $R_2$, $C_2$).

(3) Time interval ($t_2$–$t_3$).—The polarity of only the wave $V_3$ becomes plus at the time $t_2$. This plus potential is applied to the terminal 5*a* and makes the resistance of path $PH_3$ low. This low resistance causes the transistor $Tr_1$ to be cut off. However, the output potential $V_6$ is not changed since the transistor $Tr_1$ has been cut off at the time $t_1$.

(4) Time $t_3$.—The polarity of the wave $V_3$ becomes minus at the time $t_3$. Because this minus voltage cuts off the transistor $Tr_3$, the base potential of the transistor $Tr_1$ rises abruptly. In this case, since the collector potential of the transistor $Tr_1$ is high while the collector potential of the transistor $Tr_2$ is low, the current from the source (+E) surges into the transistor $Tr_1$.

Accordingly, the transistor $Tr_1$ becomes "ON," and the transistor $Tr_2$ is cut off ("OFF" state). As a result of these operations, the collector potential of the transistor $Tr_1$ drops in an instant simultaneously with the termination instant ($t_3$) of the plus potential of the wave $V_3$.

(5) Time interval ($t_3$–$t_6$).—In this interval, both of the outputs ($V_3$ and $V_4$) are minus. These minus potentials cause the resistances of the paths $PH_3$ and $PH_4$ to be high, so that the oscillator 4*a* operates as an astable multivibrator and generates a rectangular wave $V_5$ the period of which is proportional to the sum of time constants $C_1$, $R_1$ and $C_2$, $R_2$.

(6) Time interval ($t_6$–$t_8$).—At the time $t_6$, the polarity of the wave $V_3$ changes to plus, so that the path $PH_3$ assumes low resistance. Accordingly, the transistor $Tr_1$ is cut off, and the transistor $Tr_2$ becomes "ON." As a result of this operation, the output ($V_6$) assumes plus polarity which is sustained from the time $t_6$ to a time $t_8$. In this period ($t_6$–$t_8$), the oscillation of the oscillator 4*a* stops. At the time $t_8$, the "ON" state is switched from the transistor $Tr_2$ to the transistor $Tr_1$ as described with respect to the time $t_3$.

(7) Time interval ($t_8$–$t_9$).—The operation during this period is the same as that of the period ($t_1$–$t_2$).

(8) Time $t_9$.—The polarity of only the wave $V_4$ becomes plus at the time $t_9$. This plus potential is applied to the terminal 5*b* and makes the resistance of path $PH_4$ low. This low resistance causes the transistor $Tr_2$ to be cut off. However, the output $V_6$ is not changed since the transistor $Tr_2$ has been cut off at the time $t_8$. This state continues from the time $t_8$ to the time $t_{11}$.

(9) Time $t_{11}$.—

At time $t_{11}$, since the polarity of the wave $V_4$ becomes minus, the transistor $Tr_4$ assumes the "OFF" state, and the path $PH_4$ assumes high resistance. As a result of this operation, the base potential of the transistor $Tr_2$ rises abruptly, whereby a current $i_2$ surges into the transistor $Tr_2$. Accordingly, the "ON" state is transferred from the transistor $Tr_1$ to the transistor $Tr_2$. This state continues until a time $t_{12}$.

(10) Time $t_{12}$.—

(i) when the duration $t_{11}$ to $t_{12}$ is equal to or less than the duration T: simultaneously with the transition of the wave $V_4$ from minus to plus, the "ON" state is switched from the transistor $Tr_2$ to the transistor $Tr_1$.

(ii) When the duration from the time $t_{11}$ to transition instant $t_{12}$ is greater than the duration T: in the duration $t_{11}$ to $t_{12a}$, the oscillator 4*a* operates as an astable multivibrator. Accordingly, the "ON" state switches, at a time $t_{12}$ corresponding to the transition instant of the oscillator 4*a*, from the transistor $Tr_2$ to the transistor $Tr_1$. At a time $t_{12a}$, the polarity of the output ($V_6$) of the oscillator 4*a* does not change.

(11) Time interval ($t_{12}$–$t_{14}$).—The operation in this period is the same as that in the period ($t_9$–$t_{11}$).

(12) Time interval ($t_{14}$–$t_{15}$).—The operation in this period is the same as that in the period ($t_1$–$t_2$).

(13) Time $t_{15}$.—The operation in this period is the same as that in the period ($t_2$–$t_3$).

According to the system of this invention, since a transmitted telegraph signal, which has not been regeneratable in the conventional art, due to distortion or destruction of its waveform, can be completely regenerated, it is possible to transmit, through a limited telegraph pass band, a telegraph signal modulated with a frequency which is more than twice the modulation frequency in a conventional system. In other words, a telegraph signal transmitted through a telegraph pass band of less than half of the essential width for a conventional system can be completely regenerated by the regenerating system of this invention. The resulting economical transmission of telegraph signals is an important feature of this invention.

The level range can be established in any zone, for example plus voltage zone or minus voltage zone, if suitable.

A telegraph signal transmitted through any transmission system as well as transmission by frequency modulation, for example transmission by amplitude modulation or D-C transmission, can be completely regenerated by the regeneration system of this invention.

What I claim is:

1. A regenerating system for a transmitted telegraph signal, comprising an oscillator for generating a rectangular wave having a frequency substantially equal to the frequency of the code element of the transmitted telegraph signal; a level detector for detecting whether or not the instantaneous level of the transmitted telegraph signal exceeds a predetermined level range and for detecting the polarity of the excess level of the transmitted telegraph signal from the level range; control means for causing, only when the level detector detects that the instantaneous level does not exceed the level range, the oscillator to generate the rectangular wave having the frequency of the code element of the transmitted telegraph signal and for causing, when the level detector detects that the instantaneous level exceeds the level range, the oscillator to change the polarity of the rectangular wave in accordance with the polarity of said excess level, whereby a regenerated telegraph signal is derived from the oscillator.

2. A system according to claim 1, in which the oscillator is composed of an astable multivibrator, and the control means is composed of a pair of controllable impedances which are respectively connected to control electrodes of active elements of the astable multivibrator, said pair of controllable impedances being controlled by the level detector.

3. A system according to claim 2, in which the astable multivibrator is composed of a pair of transistors and said control means is composed of a pair of transistors the collector-to-emitter paths of which respectively form said controllable impedances controlled by their base potentials.

References Cited

UNITED STATES PATENTS

| | | |
|---|---|---|
| 2,858,431 | 10/1958 | Le Fevre. |
| 3,071,733 | 1/1963 | Holzer et al. |
| 3,304,508 | 2/1967 | Danielsen et al. |
| 3,390,283 | 6/1968 | Hannigsberg. |

THOMAS A. ROBINSON, *Primary Examiner.*

U.S. Cl. X.R.

178—69; 307—268; 328—164